United States Patent [19]
Khurgin

[11] Patent Number: 4,885,898
[45] Date of Patent: Dec. 12, 1989

[54] APPARATUS FOR PROCESSING CUT FLOWERS OR SIMILAR ARTICLES

[75] Inventor: Boris Khurgin, Haifa, Israel
[73] Assignee: Devis Ltd., Haifa, Israel
[21] Appl. No.: 175,793
[22] Filed: Mar. 31, 1988

[30] Foreign Application Priority Data

Apr. 10, 1987 [IL] Israel ............................. 82159
Mar. 14, 1988 [IL] Israel ............................. 85732

[51] Int. Cl.⁴ ........................................... B65B 13/02
[52] U.S. Cl. ....................................... 53/513; 53/522; 53/556; 53/585
[58] Field of Search ............... 53/291, 295, 297, 298, 53/513, 515, 522, 556, 585

[56] References Cited

U.S. PATENT DOCUMENTS

| | | | |
|---|---|---|---|
| 3,313,090 | 4/1967 | Kerrigan | 53/556 |
| 4,208,857 | 6/1980 | Fujio | 53/585 |
| 4,470,241 | 9/1984 | Parry | 53/515 X |
| 4,480,536 | 11/1984 | Burns | 53/515 X |
| 4,570,415 | 2/1986 | Centeno | 53/515 X |
| 4,674,270 | 6/1987 | Tonus | 53/556 |
| 4,704,846 | 11/1987 | Lev | 53/522 |

FOREIGN PATENT DOCUMENTS

2536736 6/1984 France ............................. 53/585

Primary Examiner—John Sipos
Attorney, Agent, or Firm—Benjamin J. Barish

[57] ABSTRACT

Apparatus for processing cut flowers or similar articles, comprises a stand formed with an opening for receiving the stems of a bunch of the cut flowers or other articles; an elastic band holder underlying the opening and movable to either an open position or to a closed position; a drive for moving the elastic band holder first to its closed position for receiving the elastic band, and then to its open position for stretching the elastic band to enclose the bunch of stems received through the opening in the stand; and a stripper member for stripping the elastic band from the holder onto the stems inserted through the opening.

16 Claims, 6 Drawing Sheets

APPARATUS FOR PROCESSING CUT FLOWERS OR SIMILAR ARTICLES

BACKGROUND OF THE INVENTION

The present invention relates to apparatus for processing cut flowers or similar articles, such as green onions, asparagus, etc.

At the present time, the various operations in processing cut flowers are performed mostly by hand. These operations are therefore highly dependent on the availability of manpower, which is becoming increasingly expensive and difficult to obtain.

An object of the present invention is to provide apparatus for processing cut flowers or similar articles which permits the various operations involved to be performed in a more highly efficient manner so as to decrease the cost and increase the productivity of the manual labour as compared to the present techniques for performing these operations.

BRIEF SUMMARY OF THE INVENTION

According to the present invention, there is provided apparatus for processing cut flowers, comprising a stand formed with an opening for receiving the stems of a bunch of the cut flowers or other articles; an elastic band holder underlying the opening and movable to either an open position or to a closed position; means for moving the elastic band holder first to its closed position for receiving the elastic band, and then to its open position for stretching the elastic band to enclose the bunch of stems received through the opening in the stand; and a stripper member for stripping the elastic band from the holder onto the stems inserted through the opening.

The elastic band holder comprises a first plurality of pins located in a circular array about a central axis coaxial with the opening in the stand, each pin mounting one end of one of the fingers, the opposite ends of the fingers having a projection for receiving the elastic band. The elastic band holder further includes a circular ring carrying a second plurality of pins arranged in a circular array, a link coupling each of the second plurality of pins to one of the first plurality of pins, and an actuator coupled to the circular ring for displacing it laterally with respect to the axis of the opening so as to pivot the fingers, first to a closed position for receiving the elastic band, and then to an open position for stretching the elastic band to enclose the bunch of stems received through the opening in the stand.

According to another feature of the invention, the apparatus further includes an elastic tube holder for holding an elastic tube from which the elastic bands are to be cut, cutter means for cutting elastic bands from the elastic tube, indexing means for indexing the elastic tube holder to advance the elastic tube held together towards the cutter means a distance equal to the width of each elastic band to be cut during each operation of the apparatus, and feeding means for feeding each elastic band cut from the elastic tube to the elastic band holder while the latter holder is in its closed position. More particularly, the feeding means comprises a slide assembly including an upper slide plate formed with a through socket for receiving an elastic band cut by the cutter means, and lower slide plate underlying the upper slide plate. The feeding means further includes an actuator for moving both slide plates together, from a first position wherein the socket receives an elastic band after being cut by the cutter means, towards a second position wherein the socket overlies the elastic band holder, and arresting means for arresting the movement of the lower slide plate just before the upper slide plate reaches the second position, to thereby permit the elastic band within the socket to drop into the elastic band holder.

According to yet another feature of the invention, the stand further includes a plurality of fingers at one side for receiving the ends of the stems of the flowers or other articles to be bunched in order to facilitate counting their number, and a limit member at the opposite side of the stand for engaging the flowers or other articles at the opposite ends of the stems to uniformly align them. The stem further includes a handrest mounted above the upper surface of the stand adjacent the opening and engageable by the operator's hand, while gripping a bunch of the flowers or other articles whose stems are passed through the opening in the stand, to fix the length of the stems trimmed by trimming means within the stand.

BRIEF DESCRIPTION OF THE DRAWINGS

The invention is herein described, by way of example only, with reference to the accompanying drawings, wherein.

DESCRIPTION OF PREFERRED EMBODIMENTS

FIGS. 1–8

The apparatus illustrated in FIGS. 1–8 includes a stand 2 formed with a flat table 3 having an opening 4 therethrough overlying a sleeve 5 (FIG. 2) for receiving the stems of a bunch of cut flowers to be processed. Stand 2 includes cleaning brushes 6 disposed below sleeve 5 for removing excess leaves from the stems received through the opening, trimming blades 8 for trimming the stems to a specified size, and a tying device 10 for tying the stems together to form a bunch. The flowers are tied by means of an elastic band 12 (e.g., a rubber band) applied to the fingers of an elastic band holder 14 underlying opening 4 and movable first to a closed position for receiving the elastic band, and then to an open position for stretching the elastic band around the bunch of stems to be received through opening 4. The apparatus further includes a stripper ring 15 for stripping each elastic band from its holder onto the stems of the flowers inserted through opening 4.

In the apparatus illustrated in FIGS. 1–8, the elastic bands 12 are pre-cut and manually applied from a container 16 into opening 4; also the apparatus is operated by a hand button 17 and a foot pedal 18. Stand 2 further includes a flower-length measuring device 20 supported by a bracket arm 21 over opening 4. Measuring device 20 includes a plurality of stops 20a, 20b, each located at a predetermined distance above the trimming blades 8 within the stand for fixing the length of the flowers to be trimmed. A conical guiding member 22 (FIG. 2) underlies opening 4 for guiding flower stems through the opening and into the stand.

Figures 3, 3A, 4:
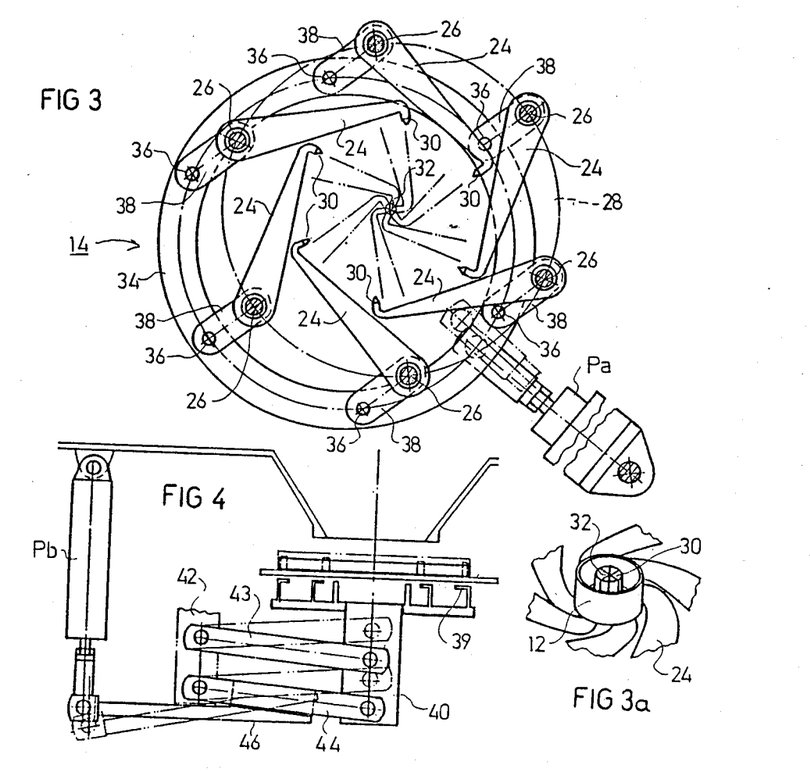
FIG. 3 is a top plan view illustrating the elastic band holder fingers in the apparatus of FIG. 1, the fingers being shown in their normal, open positions in full lines, and in their actuated closed positions in broken lines.
FIG. 3a illustrates the fingers in their closed positions with the elastic band received thereon.
FIGS. 4 and 5 are side and top views, respectively, illustrating the stripper member for stripping the elastic band from the holder.

As shown in FIGS. 3 and 3a, the holder 14 for the elastic bands 12 comprises an annular array of fingers 24 pivotally mounted at their outer ends by a pin 26 to a ring 28. The inner end of each finger 24 is formed with an upstanding projection or tooth 30 adapted to engage the elastic band 12 such that when the fingers 24 are in their closed positions (FIGS. 3a), the projections 30 define a circle of small diameter for receiving the unstretched elastic band 12, and when they are in their open positions (shown in full lines in FIG. 3), they define a circle of larger diameter for stretching the band.

Pins 26 pivotally mounting the outer ends of all the fingers 24 are located in a fixed circular array about a central axis 32 through opening 4 of the apparatus. The elastic band holder further includes a circular ring 34 carrying a second plurality of pins 36 each coupled by a link 38 to the pins 26 or to their fingers 24. An actuator, in the form of a pneumatic piston Pa, is coupled to ring 34 so as to displace the ring laterally with respect to center axis 32 and thereby to pivot the fingers 24 either to their open positions as illustrated in full lines in FIG. 3, or to their closed positions as illustrated in FIG. 3a. In the non-actuated position of piston Pa, the fingers 24 are in their closed positions (FIG. 3a) permitting their projections 30 to receive an elastic band 12 fed through opening 4; but upon the actuation of the piston, it moves ring 34 laterally to pivot the fingers 24 to their open positions (full lines, FIG. 3) and thereby to stretch and expand the elastic band 12 to enable it to receive a bunch of the stems inserted through opening 4.

Figure 5:
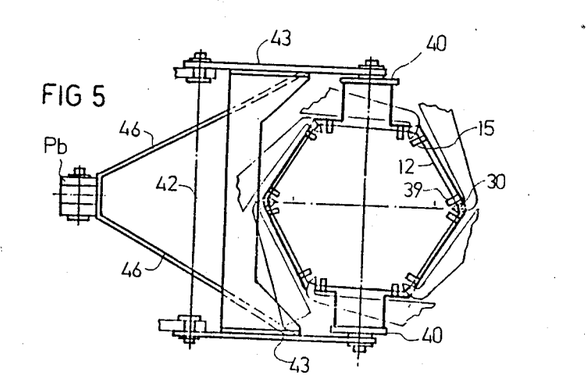

The expanded elastic band 12 is stripped from projections 30 of fingers 24 by stripper ring 15 carrying a number of stripper elements 39 underlying fingers 24 holding the elastic band 12. Stripper ring 15 is fixed between the upper ends of a pair of vertical members 40 supported for vertical movement, with respect to a mounting member 42, by a parallelogram mechanism including links 43 and 44. The lower links 44 are coupled by a pair of diverging arms 46 to a pneumatic piston Pb. In its non-actuated condition, piston Pb retains stripper elements 39 of stripper ring 15 under the holder fingers 24 of the elastic band 12; but when the piston is actuated, it raises stripper ring 15 so as to cause its stripper elements 39 to strip the elastic band 12 from the holder fingers 24.

Figures 6, 7:
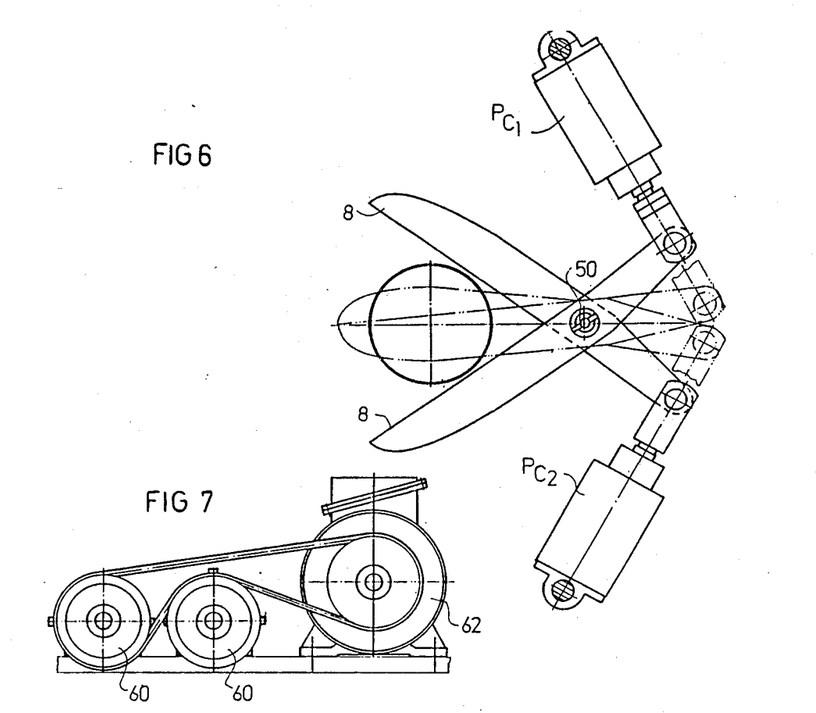
FIG. 6 is a top plan view illustrating the trimming means for trimming the stems.
FIGS. 7 and 8 are side and top views, respectively, illustrating the cleaning means for cleaning the excess leaves from the stems.

The trimming blades 8 (FIG. 2) are more particularly illustrated in FIG. 6. They are pivotally mounted by a pin 50 and are coupled to a pair of pneumatic pistons $Pc_1$, $Pc_2$, such that when the pistons are in their non-actuated condition, the trimming blades 8 are open for receiving the stems of a bunch of cut flowers inserted through opening 4, but when the pistons are actuated, the trimming blades 8 are closed to trim away the lower ends of the stems.

Figure 1:
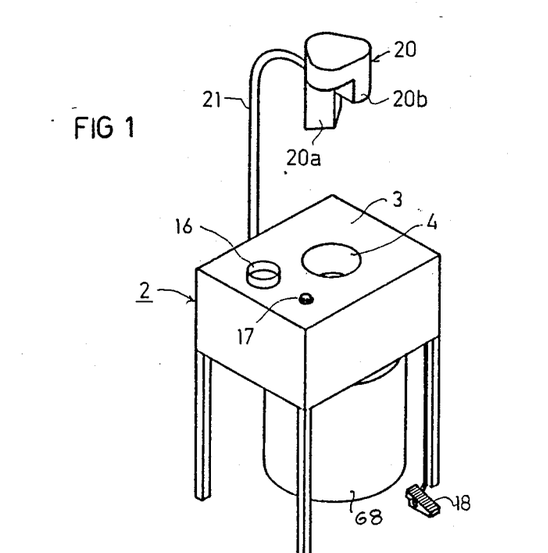
FIG. 1 illustrates one form of apparatus constructed in accordance with the present invention for processing cut flowers or similar articles.
Figure 2:
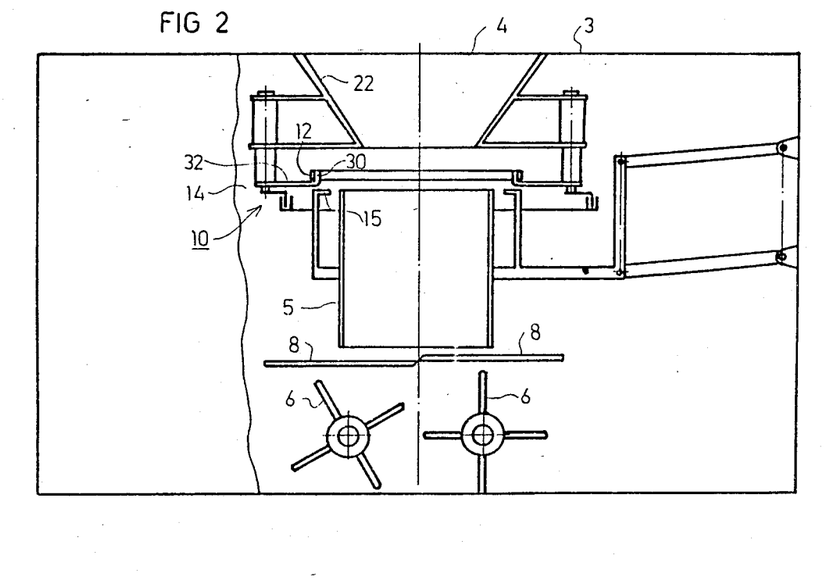
FIG. 2 illustrates the various elements within the stand of FIG. 1.
Figure 8:
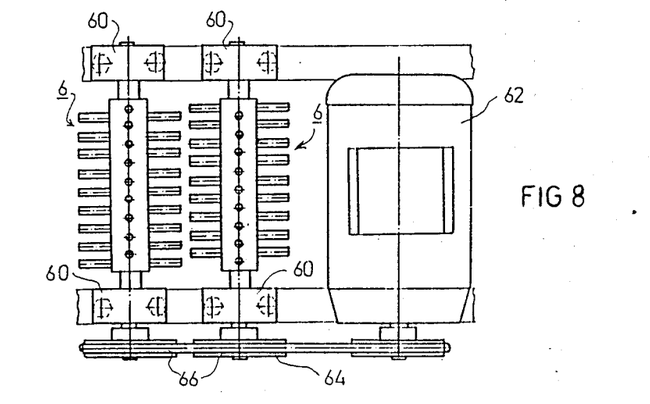

FIGS. 7 and 8 illustrate the cleaning brushes 6, which are mounted in a spaced horizontal position below the trimming blades 8. Brushes 6 are supported by bearings 60 and are driven in a counter-rotating manner by a motor 62, a closed-looped belt 64, and pulley wheels 66, so as to clean the leaves from the ends of the stems into a waste container 68 (FIG. 1).

The apparatus illustrated in FIGS. 1–8 is used in the following manner: First the operator depresses foot pedal 18 which actuates piston Pa to move the fingers 24 of the elastic band holder 14 to their closed positions (FIG. 3a); then the operator removes an elastic band 12 from receptacle 16 and drops it through opening 4, whereupon the elastic band is received around the projections 30 of fingers 24. The operator then releases foot pedal 18, which deactuates piston Pa to displace ring 34 (FIG. 3) laterally, and thereby to pivot the fingers 24 to their open positions (full-lines, FIG. 3) expanding the elastic band 12.

The operator now grasps a bunch of flowers and inserts them through opening 4 until a significant part of their lower ends are engaged by the counter-rotating cleaning brushes 6, which clean away the leaves from the ends of the stems. The operator then lifts the grasped bunch of flowers to cause their upper ends to engage a selected one of the stops 20a, 20b, which stops are located at predetermined distances above the trimming blades 8 according to the desired final length of the stems. The operator then depresses knob 17, which first actuates the two pistons $Pc_1$, $Pc_2$ (FIG. 6) closing the trimming blades 8 to trim away the excess stems, and then actuates piston Pb (FIG. 4) to raise stripper ring 15 and thereby to strip the elastic band 12 from fingers 24 onto the bunch of stems.

FIGS. 9–15

FIGS. 9–15 illustrate similar apparatus but having a number of improvements.

The apparatus illustrated in FIGS. 9–15 includes a stand 100 formed with a flat table 102 having an opening 104 therethrough overlying a sleeve 105 (FIG. 10) for receiving the stems of a bunch of cut flowers to be processed. Stand 100 includes cleaning brushes 106 disposed below sleeve 105 for removing excess leaves from the stems received through the opening, trimming blades 108 for trimming the stems to a specified size, and a tying device 110 for tying the stems together to form a bunch. The flowers are tied by means of an elastic band 112 applied to the fingers of an elastic band holder 114 underlying opening 104 and movable first to a closed position for receiving the elastic band, and then to an open position for stretching the elastic band around the bunch of stems to be received through opening 104. The apparatus further includes a stripper ring 115 for stripping each elastic band from its holder onto the stems of the flowers inserted through opening 104.

Figure 9:
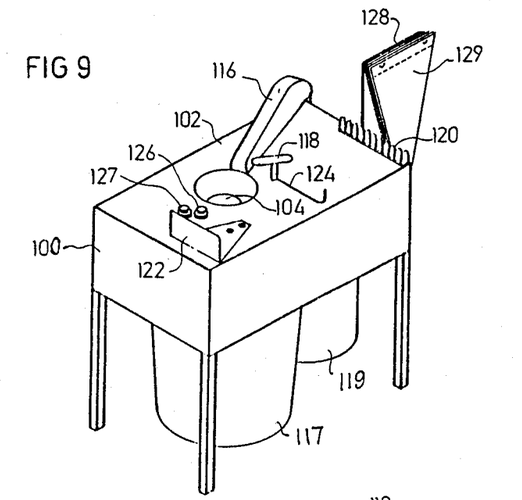
FIG. 9 illustrates another form of apparatus constructed in accordance with the present invention for processing cut flowers or similar articles.
Figure 10:
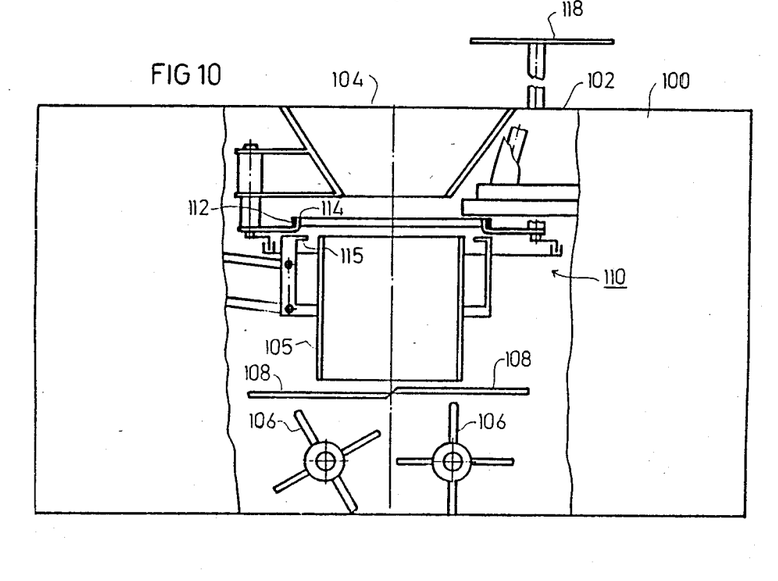
FIG. 10 illustrates the various elements within the stand of FIG. 9.
Figure 11:
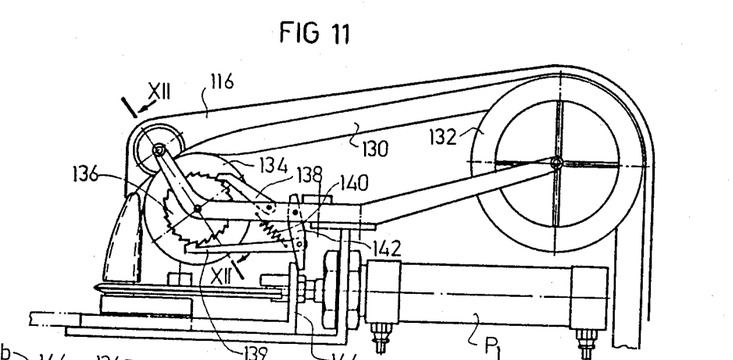
FIG. 11 is a side elevational view illustrating the mechanism for cutting and feeding the elastic bands of the apparatus of FIG. 9 before the bands are applied to the flower stems.

The cleaning brushes, trimming blades, elastic band holder, and stripper member may be the same as described above with respect to FIGS. 1-8. However, whereas those figures included an arrangement for manually feeding pre-cut elastic bands to the elastic band holder, the apparatus of FIGS. 9-15 includes an arrangement for automatically cutting an elastic band from an elastic tube during each operation of the apparatus, and for automatically feeding the cut elastic bands to the elastic band holder. The mechanism for cutting and feeding the elastic bands to opening 104 is disposed within the portion of stand 100 covered by a cover plate 116 (FIGS. 9 and 11). Underlying stand 100 are a container 117 for receiving the waste, and another container 119 for the elastic tube used for making the bands.

Stand 100 further includes a handrest 118 mounted above the upper surface of the stand adjacent opening 104 and engageable by the operator's hand, while gripping a bunch of the flowers whose stems pass through the opening, to fix the length of the stems trimmed by the trimming means within the stand.

Stand 100 further includes a plurality of fingers 120 at one side for receiving the ends of the stems to be bunched to facilitate counting their number, and a limit plate 122 at the opposite side of the stand for engaging the flowers in order to uniformly align them. Stand 100 further includes an indicator rod 124 located between fingers 120 and limit member 122 to indicate the location of the flowers received on the stand to be gripped by the operator before inserting them through opening 104.

Stand 100 further includes two buttons 126, 127, which are depressed by the operator to actuate the apparatus as will be described more particularly below, and a holder 128 for holding a plurality of bags 129 to be used for enclosing the bunched flowers.

FIGS. 11-14 more particularly illustrate the mechanism disposed within cover 116 and stand 100 for cutting and feeding the elastic bands 112 to opening 104. Briefly, this mechanism comprises a holder for an elastic tube 130 from which the elastic bands 112 are to be cut, a cutter for cutting elastic bands from the elastic tube, an indexing mechanism for indexing the holder to advance the elastic tube towards the cutter a distance equal to the width of each elastic band to be cut, and a feeder for feeding the cut elastic bands to the opening 104 while the elastic band holder under that opening is in its closed position.

Figure 12:
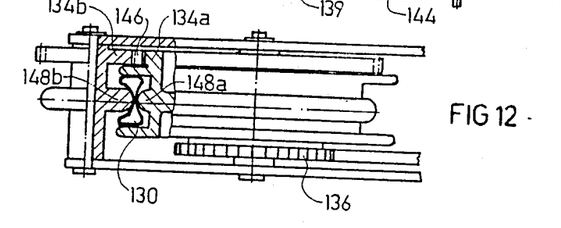
FIG. 12 is a sectional view along lines XII—XII of FIG. 11.

The holder and indexing mechanism, as more particularly illustrated in FIGS. 11 and 12, comprises a reel 132 on which the elastic tube 130 is wound, and another reel 134 indexed by a ratchet wheel 136 and a pair of pawls 138, 139. Pawl 139 is urged against the ratchet wheel by spring 140 and is oscillated by a pivotal lever 142 to step the ratchet wheel one increment during each oscillation of the lever. Lever 142 is oscillated by an arm 144 coupled to a piston $P_1$ As shown particularly in FIG. 12, reel 134 is formed of two sections 134a, 134b coupled together by gear teeth 146 on the outer circumference of each section. Both sections are formed with aligned annular ribs 148a, 148b which pinch the elastic tube 130 between them so as to index the elastic tube one increment with each actuation of the ratchet wheel 136.

Figure 13:
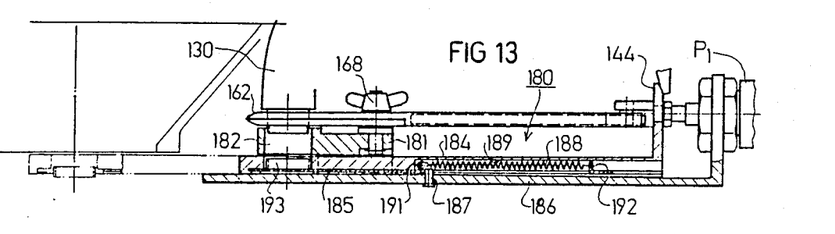
FIG. 13 is a view, partly in section, more particularly illustrating the elastic band feeding means in the mechanisms of FIGS. 11 and 12.
Figure 14:
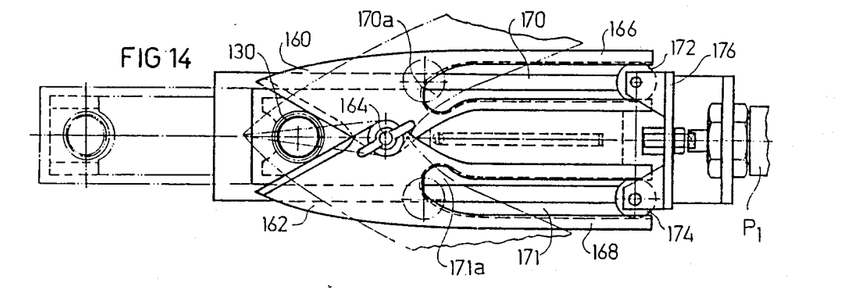
FIG. 14 is a top plan view of the feeding means of FIG. 13.

FIGS. 13 and 14 illustrate the mechanism for cutting an elastic band from the elastic tube 130, and for feeding the cut elastic band to opening 104 in the stand 100 during each operation of the apparatus.

The cutting mechanism includes two blades 160, 162 at the outlet end of the two-section reel 134a, 134b feeding the elastic tube 130. Each of the two blades includes, on the opposite side of its pivotal mounting 164, an elongated arm 166, 168 each formed with an elongated slot 170, 171. Each slot receives a roller 172, 174, movable within the slot by a coupling member 176 coupled to piston $P_1$. The two slots 170, 171 are straight and parallel to each other for their complete lengths except for their inner sections adjacent the pivotal mounting 168a; there, the slots are turned inwardly towards each other as shown by end sections 170a, 171a.

It will thus be seen that at the end of the forward stroke of the piston $P_1$, the two cutting blades 160, 162 will be moved from their open position as illustrated in FIG. 14 to their closed positions to cut-off a section of the elastic tube 130 between the two blades, and that at the beginning of the return stroke the two blades will be moved back to their open positions as illustrated in FIG. 14.

The feeding mechanism for feeding a cut elastic band to opening 104 in the stand is more particularly illustrated in FIG. 13. It comprises a slide assembly, generally designated 180, underlying the two cutting blades 160, 162, and a guiding plate 181 formed with an opening 182 for receiving the elastic band 112 cut from the elastic tube 130.

Slide assembly 180 includes a top slide plate 184 and a bottom slide plate 185 both movable with respect to a fixed wall 186 having a pin 187. A spring 188 received within a recess 189 formed in the top plate 184 is fixed at one end 191 to the top plate 184, and at the opposite end to a lug 192 formed in the bottom plate 185. The top plate 184 is formed with a socket 193 normally underlying opening 182 in the guide plate 181, so as to receive the elastic band 112 cut from the elastic tube 130.

The slide assembly 180 is coupled by arm 144 to piston $P_1$ so as to be reciprocated by that piston. In the normal home position of the slide assembly 180 as shown in FIG. 13, the elastic band 112 cut from the elastic tube 130 by the cutting blades 160, 162, is retained by the bottom slide plate 185 in socket 193 of the upper slide plate 184. During the forward stroke of slide assembly 180 by piston $P_1$, both plates 184 and 185 are moved together towards the elastic band holder (114, FIG. 10) so as to carry with them the elastic band 112 cut from the elastic tube 130. However, towards the end of the forward stroke, lug 192 of the bottom plate 185 engages pin 187 fixed to wall 186, and thereby arrests the further movement of the bottom plate, whereas the top plate 184 continues to move to the end of the forward stroke. This brings the cut elastic band 112 within socket 193 of the top plate 184 to a position overlying the fingers of the band holder 114, thereby permitting the elastic band to drop onto the fingers, which are in their closed positions at this time.

Figure 15:
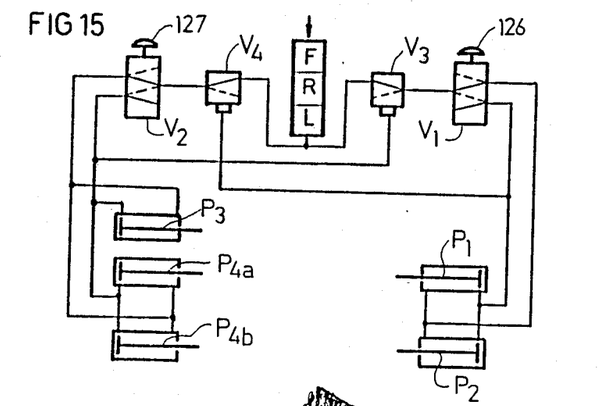
FIG. 15 is a diagram illustrating the overall control system of the apparatus of FIG. 9.

The control system for the illustrated apparatus is a pneumatic system illustrated in FIG. 15. Thus, button 126 on the upper surface of stand 100 controls, via valve $V_1$, piston $P_1$ which drives the indexing means including pawls 138, 139, ratchet wheel 136, and reel 134, one increment during each depression of the button. Button 126 also controls piston $P_2$ which drives the fingers of the elastic band holder mechanism to their open positions. Button 127 controls, via valve $V_2$, piston $P_3$ which actuates the stripper ring 115 to strip the rubber band from the band holder 114, and also actuates the two pistons $P_{4a}$, $P_{4b}$, which drive the trimmer blades 108 for trimming the stems. The cleaning brushes 106 are continuously driven. The pneumatic system further includes the conventional filter F, regulator R, lubricator L, and interlocking valves $V_3$ and $V_4$ to assure that when button 126 is operated to actuate its pistons $P_1$, $P_2$, button 127 is disabled from actuating its pistons $P_3$, $P_{4a}$, $P_{4b}$, and vice versa.

Figure 16A:
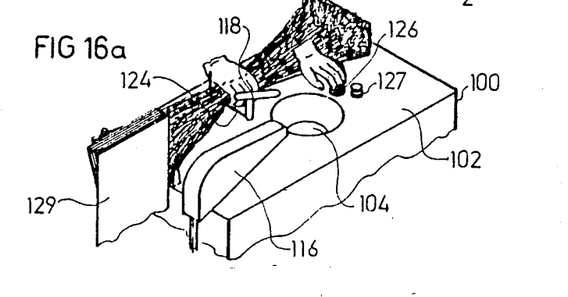
FIGS. 16a–16c are pictorial illustrations showing the manner of using the apparatus of FIGS. 9–15 for processing cut flowers.

The overall operation of the apparatus will now be described particularly with reference to the control system illustrated in FIG. 15, and the pictorial illustrations of FIGS. 16a–16c.

The operator places the flowers on table 102 of stand 100, with each flower stem received between a pair of fingers 120 (FIG. 9), and with the opposite end of the cut flower engaging limit plate 122. The fingers 120 thus facilitate counting the number of stems placed on the stand, whereas limit plate 122 uniformly aligns all the flowers. When a predetermined number have thus been placed, the operator grasps the stems at the location of indicator rod 124 (FIG. 16a) and depresses button 126. Upon depression of button 126, piston $P_1$ is actuated to move the slide assembly 180 towards the fingers of the elastic band holder 114, which fingers are normally in their closed condition, and to drop the elastic band 112, cut from the elastic tube 130 during the previous machine operation, over the closed fingers. At the end of the forward stroke, the cutting blades 160, 162 are actuated to cut another elastic band from the tube, which elastic band is received within opening 182 for use in the next operation of the apparatus. At the end of the return stroke, piston $P_1$ actuates the indexing mechanism including pawls 138, 139, ratchet 136, and reel 134, to advance the elastic tube 130 towards the cutter blades 164, 166 a distance equal to the width of each elastic band, for the next operation.

The fingers of the band holder 114 are normally in their closed positions to receive the cut band 112. Depression of button 126 also actuates piston $P_2$ to open the fingers at the end of the return stroke, to thereby stretch the elastic band 112 to the position illustrated in FIGS. 10 and 16b, ready for receiving the stems of the bunch of flowers gripped by the operator.

Figure 16B:
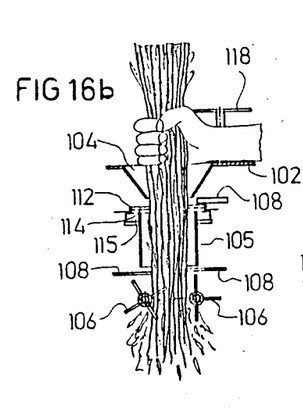
Figure 16C:
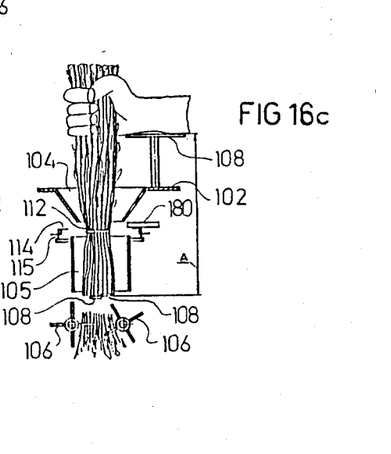

The operator then inserts the stems of the grasped bunch of flowers through opening 104 with the operator's hand engaging the upper surface of table 102, as shown in FIG. 16b, whereupon the cleaning brushes 106 remove excess leaves from the lower ends of the stems. The operator then lifts the bunch of stems to the level of hand grip 118, as shown in FIG. 16c, and depresses button 127. This energizes piston $P_3$ to actuate the stripper ring 115 which strips the elastic band 112 from the band holder 114 onto the bunch of stems. It also energizes pistons $P_{4a}$, $P_{4b}$ to actuate the trimmer blades 108 which trim the stems to a specified size, as indicated by dimension A in FIG. 16c. The operator may then remove the bunch of flowers from stand 100 and apply one of the plastic bags from holder 118 to the flower ends of the bunch.

I claim:

1. Apparatus for processing cut flowers or similar articles, comprising: a stand formed with an opening for receiving the stems of a bunch of the cut flowers or other articles; an elastic band holder underlying the opening and comprising a plurality of fingers; a first plurality of pins located in a circular array about a central axis coaxial with said opening in the stand, and each mounting one end of one of said fingers, the opposite ends of said fingers having a projection receiving an elastic band; a circular ring carrying a second plurality of pins arranged in a circular array; a link coupling each of said second plurality of pines to one of said first plurality of pins; an actuator coupled to said circular ring for displacing it laterally with respect to the axis of said opening so as to pivot said fingers first to a closed position for receiving the elastic band, and then to an open position for stretching the elastic band to enclose the bunch of stems received through the opening in the stand; and a stripper member for stripping the elastic band from the holder onto the stems inserted through the opening.

2. The apparatus according to claim 1, wherein said stripper member comprises a ring normally underlying said fingers and movable, when the fingers are in their open positions, towards said fingers to strip the elastic band therefrom onto the stems inserted into said opening.

3. The apparatus according to claim 1, wherein said stand further includes cleaning means below said opening for removing leaves from the stems received through said opening, and trimmer means for trimming said stems.

4. The apparatus according to claim 3, wherein said cleaning means comprises rotary brushes below said opening on the opposite sides thereof for receiving the stems inserted through said opening.

5. The apparatus according to claim 1, wherein the stand further includes an elastic tube holder for holding an elastic tube from which the elastic bands are to be cut; cutter means for cutting elastic bands from said elastic tube; indexing means for indexing the elastic tube holder to advance the elastic tube held thereby towards said cutter means a distance equal to the width of each elastic band to be cut during each operation of the apparatus; and feeding means for feeding each elastic band cut from the elastic tube to the elastic tube holder while the latter holder is in its closed position.

6. The apparatus according to claim 5, wherein said feeding means comprises a slide movable from a first position for receiving the elastic band cut from the elastic tube, to a second position overlying said elastic band holder for dropping the cut elastic band onto the elastic band holder while the latter is in its closed position.

7. The apparatus according to claim 5, wherein said stand further includes a handrest mounted above the upper surface of the stand adjacent said opening and engageable by the operator's hand, while gripping a bunch of the flowers or other articles whose stems are passed through said opening in the stand, to fix the length of the stems trimmed by said trimming means within the stand.

8. The apparatus according to claim 5, wherein said stand further includes a plurality of fingers at one side for receiving the ends of the stems of the flowers or other articles to be bunched in order to facilitate counting their number; and a limit member at the opposite side of the stand for engaging the flowers or other articles at the opposite ends of the stems to uniformly align them.

9. The apparatus according to claim 8, wherein said stand further includes an indicator located between said fingers and limit member to indicate the location of the flowers or other articles received on the stand to be gripped by the operator before inserting the stems through said opening in the stand.

10. Apparatus for processing cut flowers or similar articles, comprising: a stand formed with an opening for receiving the stems of a bunch of the cut flowers or other articles; an elastic band holder underlying the opening and movable to either an open position or to a closed position; means for moving the elastic band holder first to its closed position for receiving the elastic band, and then to its open position for stretching the elastic band to enclose the bunch of stems received through the opening in the stand; a stripper member for stripping the elastic band from the holder onto the stems inserted through the opening; an elastic tube holder for holding an elastic tube from which the elastic bands are to be cut; cutter means for cutting elastic bands from said elastic tube; indexing means for indexing the elastic tube holder to advance the elastic tube held thereby towards said cutter means a distance equal to the width of each elastic band to be cut during each operation of the apparatus; a slide assembly including an upper slide plate formed with a through socket for receiving an elastic band cut by said cutter means, and a lower slide plate underlying said upper slide plate; an actuator for moving both said slide plates together, from a first position wherein said socket receives an elastic band after being cut by said cutter means, towards a second position wherein said socket overlies said elastic band holder; and arresting means for arresting the movement of said lower slide plate just before the upper slide plate reaches said second position, to thereby permit the elastic band within the socket to drop into said elastic band holder while the elastic band holder is in its closed position.

11. The apparatus according to claim 10, wherein said actuator also actuates said cutter means when said upper slide plate is moved to its second position to cut another elastic band to be received in said socket when the upper slide plate returns to its first position.

12. The apparatus according to claim 11, wherein said actuator also indexes said indexing means.

13. The apparatus according to claim 10, wherein said stand further includes a handrest mounted above the upper surface of the stand adjacent said opening and engageable by the operator's hand, while gripping a bunch of the flowers or other articles whose stems are passed through said opening in the stand, to fix the length of the stems trimmed by said trimming means within the stand.

14. The apparatus according to claim 10, wherein said stand further includes a plurality of fingers at one side for receiving the ends of the stems of the flowers or other articles to be bunched in order to facilitate counting their number; and a limit member at the opposite side of the stand for engaging the flowers or other articles at the opposite ends of the stems to uniformly align them.

15. The apparatus according to claim 14, wherein said stand further includes an indicator located between said fingers and limit member to indicate the location of the flowers or other articles received on the stand to be gripped by the operator before inserting the stems through said opening in the stand.

16. Apparatus for processing cut flowers, comprising: a stand formed with an opening for receiving the stems of a bunch of the cut flowers; an elastic band holder underlying the opening for applying an elastic band to the stems of the bunch of cut flowers inserted in said opening; a plurality of fingers at one side of the stand for receiving the ends of the stems of the cut flowers to be bunched in order to facilitate counting their number; a limit member at the opposite side of the stand for engaging the opposite ends of the stems to uniformly align them; trimming means within the stand underlying said opening; a handrest mounted above the upper surface of the stand adjacent said opening and engageable by the operator's hand, while gripping a bunch of the flowers whose stems are passed through said opening in the stand, to fix the length of the stems trimmed by said trimming means within the stand; and an indicator located between said fingers and limit member to indicate the location of the flowers received on the stand to be gripped by the operator before inserting the stems through said opening in the stand.

* * * * *